(12) United States Patent
Hsieh

(10) Patent No.: US 11,519,448 B2
(45) Date of Patent: Dec. 6, 2022

(54) ROTARY FASTENING DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 689 days.

(21) Appl. No.: 16/554,594

(22) Filed: Aug. 28, 2019

(65) Prior Publication Data

US 2020/0232497 A1   Jul. 23, 2020

Related U.S. Application Data

(60) Provisional application No. 62/794,714, filed on Jan. 21, 2019.

(51) Int. Cl.
| | | |
|---|---|---|
| B25B 21/00 | (2006.01) | |
| F16B 31/02 | (2006.01) | |
| F16B 21/08 | (2006.01) | |
| F16B 11/00 | (2006.01) | |
| F16B 23/00 | (2006.01) | |

(52) U.S. Cl.
CPC ............ *F16B 31/027* (2013.01); *F16B 11/00* (2013.01); *F16B 21/082* (2013.01); *F16B 23/0015* (2013.01); *F16B 23/0061* (2013.01)

(58) Field of Classification Search
CPC .... B25B 21/007; B25B 21/02; B25B 23/0035
See application file for complete search history.

(56) References Cited

U.S. PATENT DOCUMENTS

| | | | | |
|---|---|---|---|---|
| 5,509,333 | A * | 4/1996 | Rion ...................... | B25B 23/00 81/177.85 |
| 9,566,692 | B2 * | 2/2017 | Seith ...................... | B25B 21/02 |
| 10,315,294 | B2 * | 6/2019 | Rettler ................ | B25B 23/1475 |
| 10,391,615 | B2 * | 8/2019 | Hsieh ..................... | B25B 13/06 |
| 10,471,574 | B2 * | 11/2019 | Liu ..................... | B25B 23/0035 |
| 10,569,392 | B2 * | 2/2020 | Chern .................. | B25B 13/065 |
| 10,625,403 | B2 * | 4/2020 | Hsieh ..................... | B25B 13/06 |
| 10,800,015 | B2 * | 10/2020 | Zhang ................ | B25B 23/0035 |
| 11,313,357 | B2 * | 4/2022 | Hsieh ..................... | B25B 13/06 |
| 2018/0311800 | A1 * | 11/2018 | Chu .................... | B25B 23/0035 |
| 2019/0247986 | A1 * | 8/2019 | Hsieh .................... | F16B 21/165 |
| 2020/0400212 | A1 * | 12/2020 | Hsieh .................. | B25B 23/0035 |

FOREIGN PATENT DOCUMENTS

JP     3218145 U     9/2018

* cited by examiner

*Primary Examiner* — Flemming Saether
(74) *Attorney, Agent, or Firm* — CKC & Partners Co., LLC

(57) ABSTRACT

A rotary fastening device includes a rotating axial member and an inertia member. The rotating axial member includes a base body, an input end, an output end and an engaging portion. The input end is disposed at one end of the base body and selectively connected to a wrench. The output end is disposed at the other end of the base body. The engaging portion is disposed on the base body. The inertia member is detachably connected to the rotating axial member, and includes a gravity portion and an engaging hole. The gravity portion is extended toward the output end of the rotating axial member so as to form an annular space. The engaging hole is communicated to the annular space.

8 Claims, 3 Drawing Sheets

ROTARY FASTENING DEVICE

RELATED APPLICATIONS

This application claims priority to U.S. Provisional Application Ser. No. 62/794,714, filed Jan. 21, 2019, which is herein incorporated by reference.

BACKGROUND

Technical Field

The present disclosure relates to rotary fastening device. More particularly, the present disclosure relates to increase a torque of the rotary fastening device applied to a fastener.

Description of Related Art

Recently, a rotary fastening device is becoming lighter and smaller, and a torque of the rotary fastening device is limited by an electric motor of the rotary fastening device, so that the rotary fastening device cannot satisfy the lighter, smaller and favorable torque at same time. In order to enhance the torque of the rotary fastening device, an industry provides a one-piece inertia member on the rotary fastening device so as to enhance the torque of the rotary fastening device. However, the one-piece inertia member cannot be replaced, so that a convenience of the rotary fastening device is decreased.

Hence, how to enhance the convenience and the torque of the rotary fastening device so as to screw or unscrew the fastener is a target of the industry.

SUMMARY

The present disclosure provides a rotary fastening device includes a rotating axial member and an inertia member. The rotating axial member includes a base body, an input end, an output end and an engaging portion. The input end is disposed at one end of the base body and selectively connected to a wrench. The output end is disposed at the other end of the base body. The engaging portion is disposed on the base body. The inertia member is detachably connected to the rotating axial member, and includes a gravity portion and an engaging hole. The gravity portion is extended toward the output end of the rotating axial member so as to form an annular space. The engaging hole is communicated to the annular space.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
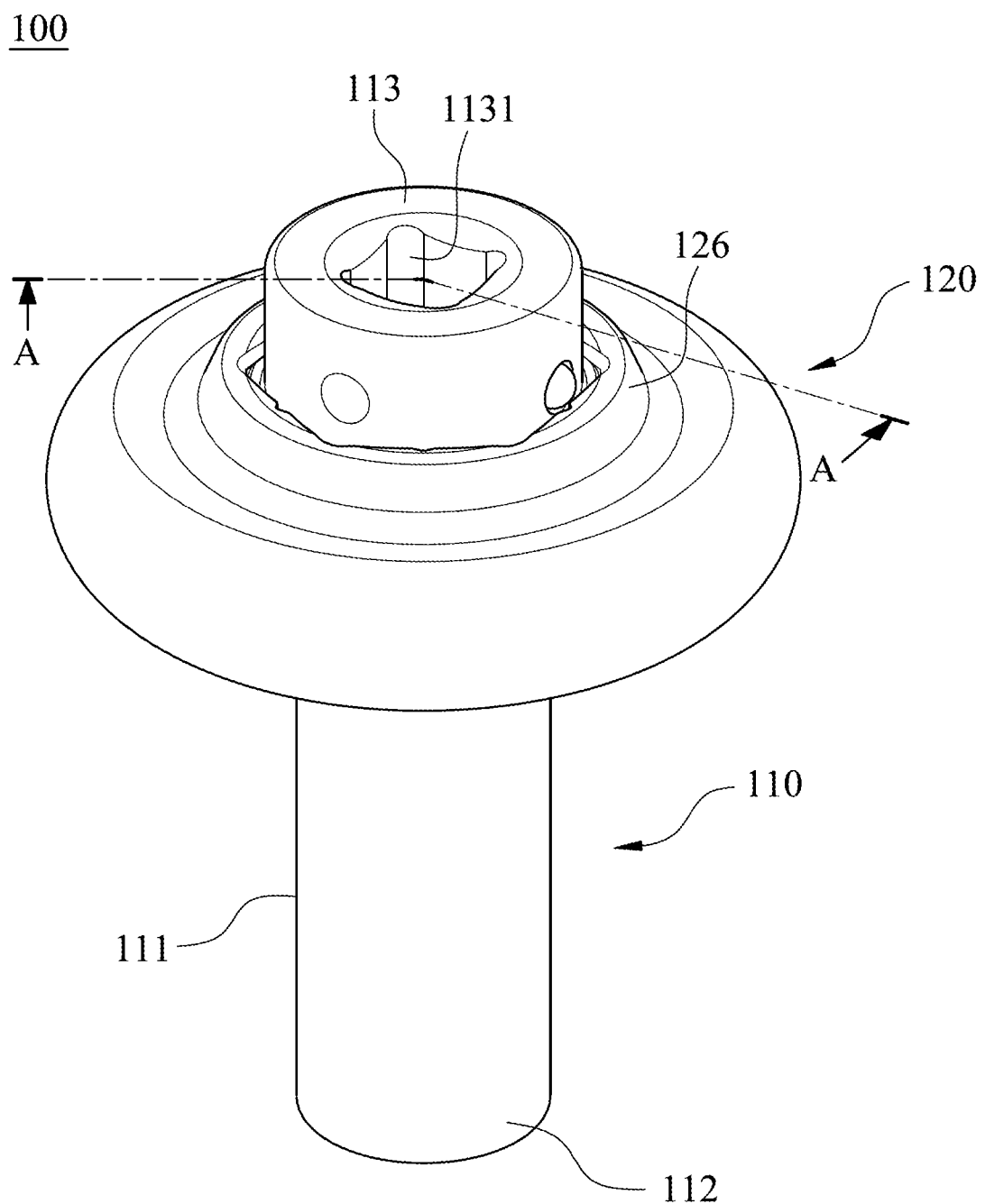
FIG. 1 is a schematic view of a rotary fastening device according to one embodiment of the present disclosure.
Figure 2:
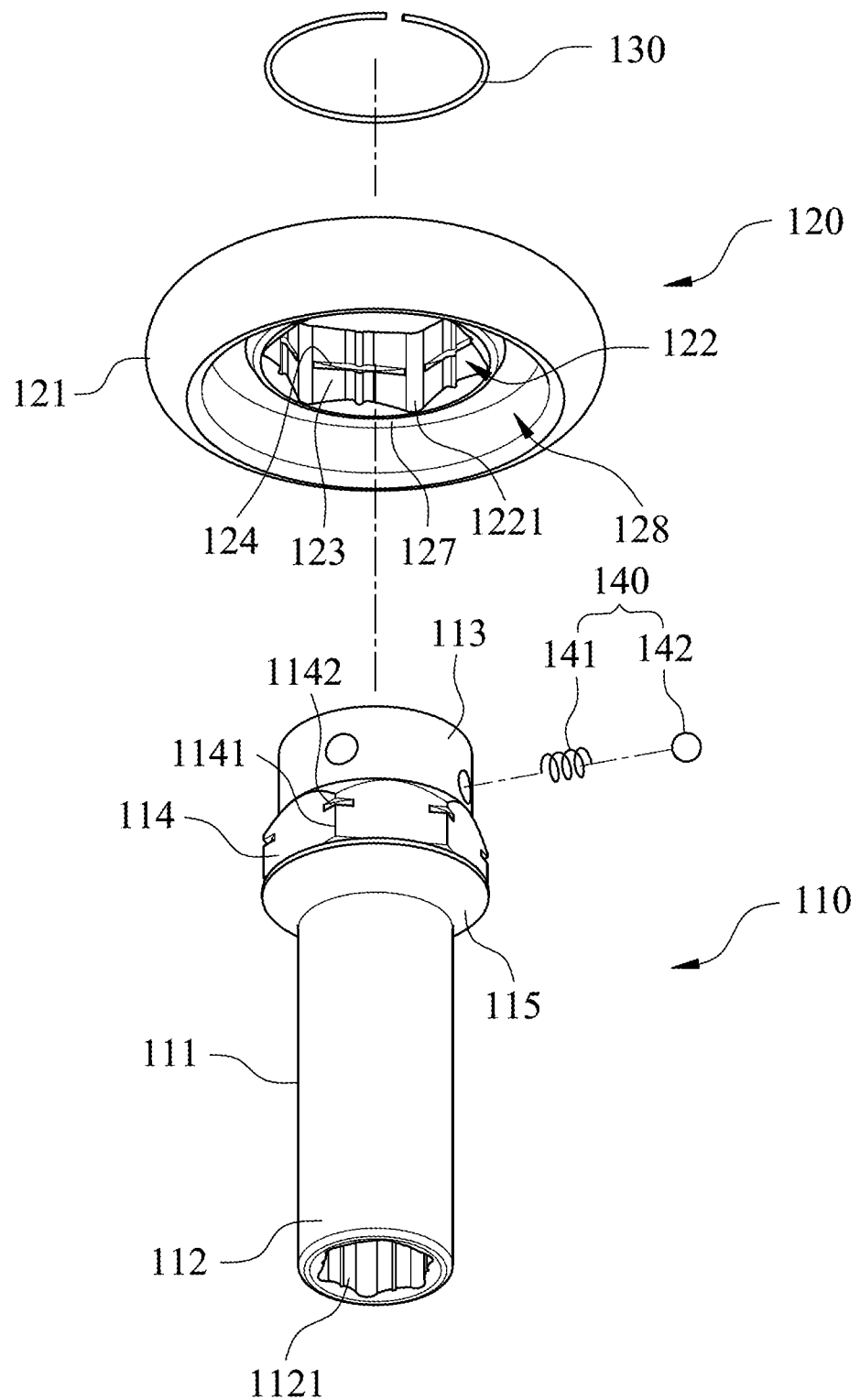
FIG. 2 is an exploded view of the rotary fastening device according to FIG. 1.
Figure 3:
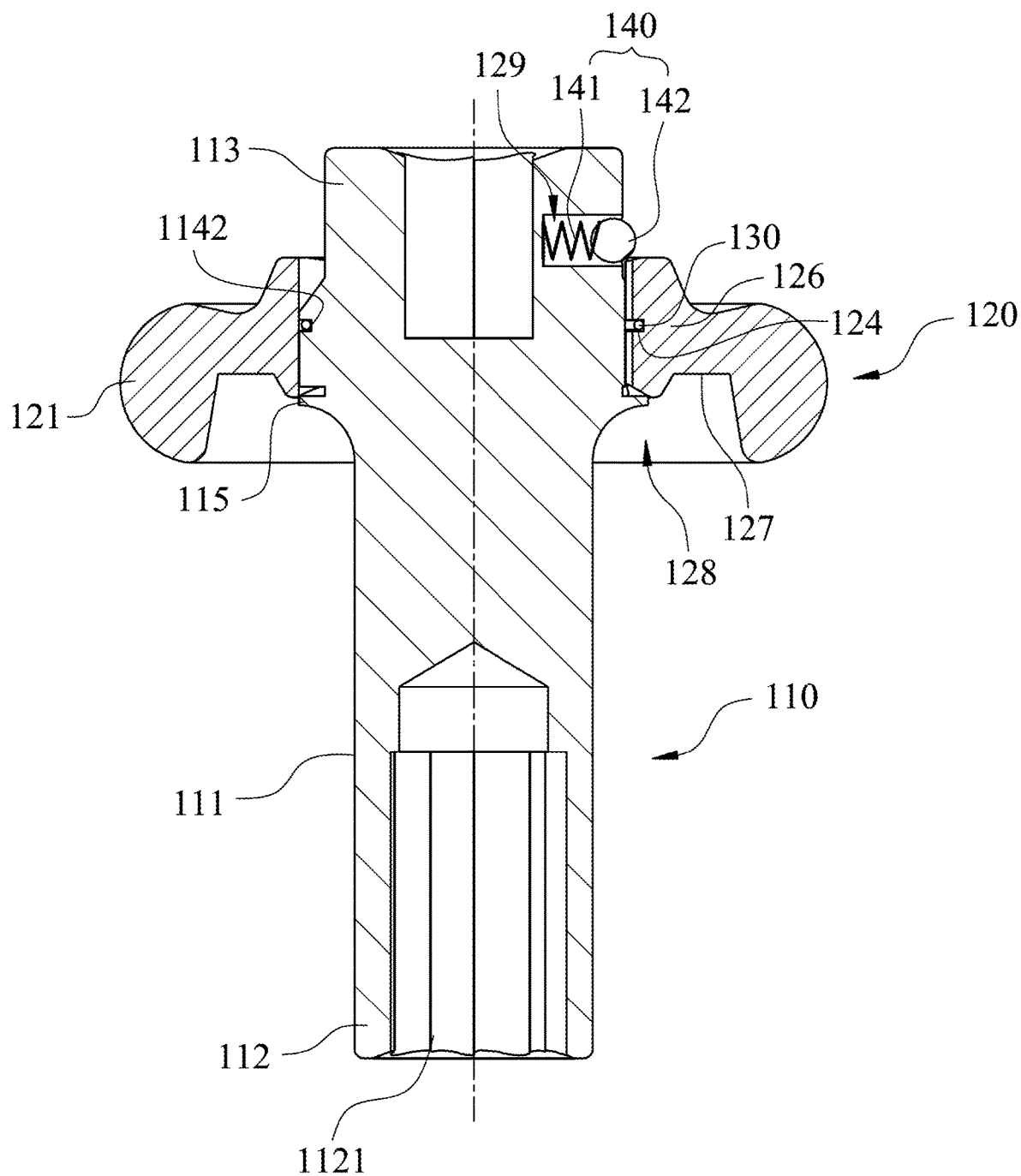
FIG. 3 is a cross-sectional view along A-A of the rotary fastening device according to FIG. 1.

FIG. 1 is a schematic view of a rotary fastening device 100 according to one embodiment of the present disclosure. FIG. 2 is an exploded view of the rotary fastening device 100 according to FIG. 1. FIG. 3 is a cross-sectional view of the rotary fastening device 100 along A-A according to FIG. 1. In FIGS. 1-3, the rotary fastening device 100 includes a rotating axial member 110 and an inertia member 120. The inertia member 120 is detachably connected to the rotating axial member 110.

In detail, the rotating axial member 110 includes a base body 111, an input end 113, an output end 112 and an engaging portion 114. The input end 113 is disposed at one end of the base body 111 and is for connecting to a wrench (not shown), such as an electrical wrench, an impact wrench or a torque wrench. The input end 113 includes an input hole 1131. The input hole 1131 can be a square hole and is for connecting to the wrench, so that the wrench can drive the rotary fastening device 100 via the input hole 1131. The output end 112 is disposed at the other end of the base body 111 and includes an output hole 1121. The output hole 1121 can be a hexagon hole and is for connecting to and driving a fastener, such as a screw, a nut or a thread rod. It should be mentioned that the shapes of the input hole 1131 and the output hole 1121 would not be limited to the embodiment of FIGS. 1 and 2. The engaging portion 114 is disposed on the base body 111. The inertia member 120 is fixed to the engaging portion 114 of the rotating axial member 110, and includes a gravity portion 121 and an engaging hole 122. The gravity portion 121 is extended toward the output end 112 of the rotating axial member 110 so as to form an annular space 128. The engaging hole 122 is communicated to the annular space 128. Therefore, when the wrench is connected to the rotating axial member 110 of the rotary fastening device 100, both of the inertia member 120 and the rotating axial member 110 can be driven by the wrench so as to screw or unscrew the fastener. Because the gravity portion 121 is extended toward the output end 112 of the rotating axial member 110, the annular space 128 is faced to the output end 112 of the rotating axial member 110 so as to reduce a center of gravity of the inertia member 120. In other words, when the rotary fastening device 100 is driven, the center of gravity of the inertia member 120 would approach to the output end 112, so that a torque of the rotary fastening device 100 can be increased.

The engaging portion 114 of the rotating axial member 110 includes a plurality of engaging teeth 1141, and a number of the engaging teeth 1141 is 6 according to the embodiment of FIG. 2, but the present disclosure is not limited thereto. In FIG. 2, each of the engaging teeth 1141 is a tip-shaped. The engaging hole 122 includes a plurality of engaging slots 1221, and a number of the engaging slots 1221 is 6 according to the embodiment of FIG. 2, but the present disclosure is not limited thereto. Each of the engaging slots 1221 is corresponded to each of the engaging teeth 1141, so that the engaging hole 122 of the inertia member 120 can be engaged to the engaging portion 114 of the rotating axial member 110 so as to connect the inertia member 120 and the rotating axial member 110. Moreover, the engaging slots 1221 can avoid the engaging teeth 1141 being abrasion during the rotary fastening device 100 is driven by the wrench.

In order to screw or unscrew the fasteners having different size, the inertia member 120 can be connected with different rotating axial members 110 having different sizes of the output holes 1121. In other words, the inertia member 120 can be engaged or detached to different rotating axial members 110 having different sizes of the output holes 1121. Therefore, the user can select different rotating axial members 110 according to the size of the fastener, and then connect the selected rotating axial member 110 with the inertia member 120 so as to screw or unscrew the fastener, so that a convenience of the rotary fastening device 100 can be increased.

Please refer to FIGS. 2 and 3, in order to connect the rotating axial member 110 with the inertia member 120 more stably, the inertia member 120 can further include a plurality of inner walls 123 and a plurality of embedding slots 124, and the rotary fastening device 100 can further include a C-ring 130. In detail, each of the embedding slots 124 is respectively disposed at each of the inner walls 123 and the C-ring 130 is elastically embedded in the embedding slots 124 of the inertia member 120 (shown in FIG. 3). The engaging portion 114 further includes a plurality of fixing slots 1142. Each of the fixing slot 1142 is respectively disposed at the engaging teeth 1141 and the C-ring 130 is elastically embedded in the fixing slot 1142 of the engaging portion 114 (shown in FIG. 3). In other words, when the inertia member 120 is connected to the rotating axial member 110, the C-ring 130 is elastically embedded in the fixing slots 1142 of the engaging portion 114 of the rotating axial member 110 and the embedding slots 124 of the inertia member 120 so as to enhance the connecting strength between the inertia member 120 and the rotating axial member 110. Because each of the inner walls 123 is disposed between two engaging slots 1221 and each of the engaging slots 1221 is corresponded to each of the engaging teeth 1141 so that the contact area between each of the inner walls 123 of the inertia member 120 and the engaging potion 114 of the rotating axial member 110 can be increased. The rotating axial member 110 further includes a ring positioning portion 115. The ring positioning portion 115 is disposed at the base body 111 and connected to the engaging portion 114. Therefore, when the rotary fastening device 100 is driven, the C-ring 130 can avoid the inertia member 120 detached from the rotating axial member 110 toward the input end 113, and the ring positioning portion 115 can avoid the inertia member 120 detached from the rotating axial member 110 toward the output end 112, so that the inertia member 120 can be firmly engaged to the rotating axial member 110 so as to enhance the torque of the rotary fastening device 100.

The inertia member 120 can further include a convex portion 126. The convex portion 126 is extended toward the input end 113 of the rotating axial member 110. Therefore, the center of gravity of the inertia member 120 can be reduced. In detail the center of gravity of the inertia member 120 would approach to the output end 112 so as to increase the torque of the rotary fastening device 100.

The inertia member 120 can further includes a rear surface 127. The rear surface 127 has a recognizing color. In detail, the rear surface 127 can provide a fool proof function, such as the rear surface 127 has green color representing an output end side of the inertia member 120 so as to avoid the user combined the rotating axial member 110 to the inertia member 120 by wrong side.

In order to avoid the inertia member 120 detached from the rotating axial member 110, the rotary fastening device 100 can further include at least one resisting unit 140. The resisting unit 140 is disposed at the base body 111 close to the input end 113 and includes an elastic element 141 and a ball element 142. The elastic element 141 can be a spring and the ball element 142 can be a steel ball, which will not be limited thereto. The ball element 142 is connected to one end of the elastic element 141 for abutting against the inertia member 120. In detail, the rotating axial member 110 further includes at least one receiving slot 129. The at least one receiving slot 129 is disposed at the base body 111 close to the input end 113. In FIG. 3, the resisting unit 140 is disposed in the receiving slot 129. The other end of the elastic element 141 is connected to the receiving slot 129. Therefore, when the inertia member 120 is connected to the rotating axial member 110, the ball element 142 is protruded from the receiving slot 129 of the rotating axial member 110 and abutted against the inertia member 120, so that the resisting unit 140 and the C-ring 130 can avoid the inertia member 120 detached from the rotating axial member 110.

Given as above, the rotary fastening device can provide the following advantages:

(1) Because the gravity portion is extended toward the output end of the rotating axial member, the center of gravity of the inertia member is approach to the output end, so that the torque of the rotary fastening device can be enhanced.

(2) Each of the engaging teeth is tip-shaped, so that the durability of the rotary fastening device can be enhanced and the inertia member can be firmly connected to the rotating axial member so as to enhance the torque of the rotary fastening device.

(3) The inertia member can be connected to the rotating axial member having different size of the output hole, so that the convenience of the rotary fastening device can be increased.

(4) The convex portion is extended toward the input end of the rotating axial member, so that the center of gravity of the inertia member would approach to the output end, thus the torque of the rotary fastening device can be enhanced.

(5) The rear surface has a recognizing color so as to avoid the user connected the rotating axial member to the inertia member in wrong side.

(6) The resisting unit and the C-ring can be firmly disposed the inertia member on the rotating axial member. When the rotary fastening device is driven, the resisting unit and the C-ring can avoid the inertia member 120 detached from the rotating axial member 110 so that the torque of the rotary fastening device can be enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A rotary fastening device, comprising:
   a rotating axial member, comprising:
      a base body;
      an input end disposed at one end of the base body and for connecting to a wrench;
      an output end disposed at the other end of the base body; and
      an engaging portion disposed on the base body; and
   an inertia member detachably connected to the rotating axial member, and the inertia member comprising:
      a gravity portion protruding from a surface of the inertia member and extended toward the output end of the rotating axial member so as to form an annular space;
      an engaging hole communicated to the annular space; and a convex portion protruding from another surface of the inertia member and extended toward the input end of the rotating axial member, wherein a position of the convex portion corresponds to a position of the annular space;

wherein a center of gravity of the rotary fastening device approaches to the output end.

2. The rotary fastening device of claim 1, wherein,
the engaging portion comprises:
   a plurality of engaging teeth; and
the engaging hole comprises:
   a plurality of engaging slots, wherein each of the engaging slots is corresponded to each of the engaging teeth.

3. The rotary fastening device of claim 2, wherein each of the engaging teeth is a tip-shaped.

4. The rotary fastening device of claim 1, wherein the inertia member further comprises:
   a plurality of inner walls; and
   a plurality of embedding slots, wherein each of the embedding slots is respectively disposed at each of the inner walls.

5. The rotary fastening device of claim 4, further comprising:
   a C-ring embedded in the embedding slots of inertia member.

6. The rotary fastening device of claim 1, wherein the inertia member further comprises:
   a rear surface having a recognizing color.

7. The rotary fastening device of claim 1, further comprising:
   at least one resisting unit disposed on the base body, and the at least one resisting unit comprising:
      an elastic element; and
      a ball element connected to one end of the elastic element for abutting against the inertia member.

8. The rotary fastening device of claim 7, wherein the rotating axial member further comprising:
   at least one receiving slot disposed at the base body being close to the input end, wherein the at least one resisting unit is disposed in the at least one receiving slot.

* * * * *